United States Patent [19]
Ohtsuka et al.

[11] Patent Number: 5,313,442
[45] Date of Patent: May 17, 1994

[54] OPTICAL DISK DRIVE HAVING TRACKING CONTROL AND MIRROR SUPPORTED ON A CIRCULAR PATH

[75] Inventors: Shin'ichi Ohtsuka; Yasuyuki Ozawa, both of Kawasaki, Japan

[73] Assignee: Fujitsu Limited, Kanagawa, Japan

[21] Appl. No.: 25,404

[22] Filed: Feb. 26, 1993

[51] Int. Cl.⁵ .............................................. G11B 7/095
[52] U.S. Cl. ............................... 369/44.16; 369/44.19; 369/44.21
[58] Field of Search ......................... 369/44.14–44.16, 369/44.17, 44.19, 44.21, 44.32, 112

[56] References Cited

U.S. PATENT DOCUMENTS 4,669,073  5/1987  Wakabayashi et al. ........... 369/44.19
4,688,201  8/1987  Towner et al. .................... 369/44.19

FOREIGN PATENT DOCUMENTS 2-216625  8/1990  Japan .

*Primary Examiner*—W. R. Young
*Attorney, Agent, or Firm*—Armstrong, Westerman, Hattori, McLeland & Naughton

[57] ABSTRACT

An optical disk drive includes a stationary optical system including a tracking mirror and a movable optical system including an objective lens, wherein the tracking mirror in the stationary optical system is supported movable along a circular path perpendicular to said optical disk, about a center of the circular path located on a hypothetical line that extends from the tracking mirror toward the movable optical system and further beyond the movable optical system. The center of the circular path is set at a distance twice as large as the distance from the tracking mirror to a reference point that is located below a data region defined on the optical disk for recording information.

8 Claims, 17 Drawing Sheets

OPTICAL DISK DRIVE HAVING TRACKING CONTROL AND MIRROR SUPPORTED ON A CIRCULAR PATH

BACKGROUND OF INVENTION

The present invention generally relates to optical disk drives for recording and/or reproducing information signals on and from an optical disk, and more particularly to an optical disk drive having a separated optical system that includes a stationary optical system and a movable optical system for focusing the optical beam on the recording surface of the optical disk.

In the optical disk drives for recording and/or reproducing information signals on and from an optical disk or in the optical disk drives used explicitly for reproducing information signals from an optical disk, it is essential to minimize the access speed. In order to achieve this object, conventional optical disk drives have been constructed to have a separated construction for the optical system such that the optical system includes a stationary part fixed upon a body of the disk drive and a movable part movable with respect to the disk drive body. Thereby, the tracking and focusing control of the optical beam is achieved by moving the movable part alone with respect to the optical disk that is mounted on the optical disk drive. As the movable part is constructed to have a minimum inertia, one can maximize the access speed when reading or writing optical information.

In the optical disk drives having such a separated construction for the optical system, however, there arises a problem in that the optical path length increases substantially, and such an increase in the optical path length tends to case a problem of beam offset between the optical beam that exists from the stationary part toward the optical disk and the optical beam that returns from the optical disk after reflection. Such an offset in the optical beam causes an unwanted tracking error and the optical disk drives having the foregoing construction tend to suffer from the problem of unstable tracking control. Thus, there is a demand for an optical system that has the separated construction and simultaneously the problem of beam offset is minimized.

FIG. 1 shows an example of the conventional optical disk drive.

Referring to FIG. 1, the optical disk drive 1 includes an optical disk 2 mounted thereon for rotation by a motor 3, wherein the optical disk 2 carries thereon a number of concentric or spiral tracks not illustrated. The optical disk 2 includes a data region 4 defined by an outermost periphery 5 and an innermost periphery 6, for recording information. Further, the optical disk drive 1 includes an optical system 10 that in turn consists of a stationary part 11 and a movable part 12, wherein the stationary part 11 is mounted on a base body 9 of the optical disk drive 1.

As usual, the stationary part 11 includes a laser diode 13 for producing an optical beam, a collimator lens 65 for converting the optical beam produced by the laser diode 13 to form a parallel optical beam, a beam splitter 14 for reflecting the optical beam that has been reflected back from the optical disk 2, a two-field photodiode 15 disposed to receive the optical beam from the beam splitter 14 for detection thereof, and a mirror 18 disposed to receive the optical beam passed through the beam splitter for reflecting the same toward the movable part 12. Further, the mirror 18 is driven by a tracking mechanism 19 such that the mirror 18 is tilted by a minute angle about an axis 20 for achieving an optical tracking of the optical beam. It should be noted that the axis 20 is formed substantially coincident to the mirror plane of the mirror 18.

The output of the two-field photodiode 15 is supplied to a differential amplifier 21, and the differential amplifier 21 produces an output signal as a tracking error signal. The tracking error signal thus produced is outputted from an output terminal 22.

The movable part 12, in turn, is provided in correspondence to the data region 4 and is held movable on the base body 9 in a radial direction of the optical disk 2 as represented by an arrow 30. The movable part 12 carries thereon an objective lens 32 for focusing the optical beam on the optical disk 2 to form a tiny optical spot thereon, wherein the objective lens 32 is carried by a focusing mechanism 33 that moves the lens 32 in the direction perpendicular to the surface of the disk 2 for focusing control. Further, there is provided a mirror 34 that reflects the optical beam supplied from the stationary part 11 toward the optical disk 2.

In operation, the tracking mechanism 19 is controlled upon a control signal supplied thereto such that the mirror 18 is tilted about the axis 20, and the optical spot 31 moves in the radial direction of the disk 2. There, it should be noted that the optical beam 35 that returns from the movable part 12 to the stationary part 11 coincides with the optical beam 17 that goes from the stationary part 11 to the movable part 12, as long as the mirror 18 is not tilted. Thereby, there is no beam offset and an optical spot 36 is formed on the center of the two-field photodiode 15. On the other hand, when the beam spot 36 offsets from the center, the optical intensity distribution changes and the differential amplifier 21 produces a tracking error signal.

FIG. 2 shows a relationship between the actual tracking error on the optical disk 2 and the tracking error signal produced by the differential amplifier 21. Thus, it will be noted that there is no substantial tracking error signal as long as the optical spot 31 on the disk 2 is located at the center of track defined on the optical disk 2.

When a tracking control signal is supplied for the purpose of causing the optical spot to move in correspondence to the disk eccentricity ϵ as indicated in FIG. 3, the drive mechanism 19 is activated and the mirror 18 is tilted by a minute angle θ. In response to this, the spot 31 on the optical disk 2 moves to another track separated by a distance corresponding to the eccentricity ϵ. When such a tracking control is achieved properly, it should be noted that the optical spot 36 on the two-filed photodetector 15 should remain at the center of the field. However, this is not the case because of the reason described below.

When the mirror 18 is tilted by a minute angle θ the returning optical beam 35a shifts with respect to the exiting optical beam 17a by an offset D as indicated in FIG. 3, and such an offset D in turn causes an offset of the beam spot 36 in the upward direction by a distance β on the two-field photodetector 15. Thereby, an offset voltage $V_1$ is produced inevitably by the differential amplifier 21 indicating an erroneous tracking error 37 as represented in FIG. 2. There, the magnitude of the offset voltage $V_1$ is generally proportional to the magnitude of the beam offset D, and the beam offset D is given by the relationship $$D = 2(L+b)\tan 2\theta, \tag{1}$$

where L represents the distance between the mirror 18 and the mirror 34, while b represents the distance between the mirror 34 and a back focal point 38 of the objective lens 32. It should be noted that the back focal point 38 is located close to the mirror 34.

FIGS. 4 and 5 show other situations wherein the beam offset occurs respectively for the case where the movable part 12 is located close to the outermost periphery 5 of the data region 4 and where the movable part 12 is located close to the innermost periphery 6. Similarly to the previous case, the beam offset occurs in response to the tilting of the mirror 18 by a minute angle $\theta$.

In view of the foregoing Eq. (1) and the geometry shown in FIGS. 4 and 5, one derives the relationship between the beam offset D and the position of the movable part 12 as represented in FIG. 6 by a line II. As shown therein, the magnitude of the beam offset D under a constant tilt angle $\theta$ of the mirror 18 increases with increasing distance of the movable part 12 from the outermost periphery 5 of the data region 4. In correspondence to the beam offset D, there appears a relationship between the offset voltage $V_1$ and the position of the movable part 12 as indicated in FIG. 7 by a line III. Again, it will be noted that the offset voltage $V_1$ increases with increasing distance of the movable part 12 from the outermost periphery 5 toward the innermost periphery 6. Obviously, such an erroneous tracking error signal causes an unstable operation of the tracking system of the optical disk device.

SUMMARY OF THE INVENTION

Accordingly, it is a general object of the present invention to provide a novel and useful optical disk drive having an improved tracking control of optical beam.

Another and more specific object of the present invention is to provide an optical disk drive wherein the problem of beam offset associated with the separated construction of the optical head is minimized.

Another object of the present invention is to provide an optical disk drive for reproducing an information signal from a rotary optical disk, comprising:

revolving means mounted on a body of said optical disk drive for revolving said optical disk about a central axis;

optical source means for producing an optical beam;

an optical system for focusing said optical beam on a recording surface of said optical disk, said optical system having a separated construction and comprising a stationary part fixed against said body of said optical disk drive and a movable part that is provided movable with respect to said body;

said stationary part including first mirror means for reflecting said optical beam produced by said optical source means toward said movable part;

said movable part being disposed such that said optical beam from said stationary part is focused upon a data region that is defined on said recording surface of said optical disk as a region extending between an outer periphery and an inner periphery both being defined concentrically about said central axis, said movable part including an objective lens for focusing said optical beam on said recording surface of said optical beam in correspondence to said data region and second mirror means for receiving said optical beam from said stationary part after reflection at said first mirror means and for deflecting the same to said objective lens;

said optical disk drive further including:

support means for supporting said second mirror means in a manner movable about a circular path in a plane substantially perpendicular to said optical disk, with a center of said circular path being located on a hypothetical line that extends from said first mirror means toward said second mirror means and further beyond said second mirror means, said center being located at a position away from said first mirror means by a distance that is twice as large as a distance between said first mirror means and a reference point located on said hypothetical line immediately below a point that is included in said data region of said optical disk; and tilting means for causing a tilt of said first mirror means while said first mirror means is supported by said support means.

According to the present invention, the beam offset caused as a result of the tilting of the first mirror means for achieving a tracking control is compensated for by moving said first mirror means according to said circular path, simultaneously to the tilting of said first mirror means. Thereby, the problem of detection of apparent, erroneous tracking error signal is successfully minimized and a reliable tracking control can be achieved.

Other objects and further features of the present invention will become apparent from the detailed description when read in conjunction with the attached drawings.

DETAILED DESCRIPTION OF PREFERRED EMBODIMENTS

Figure 1:
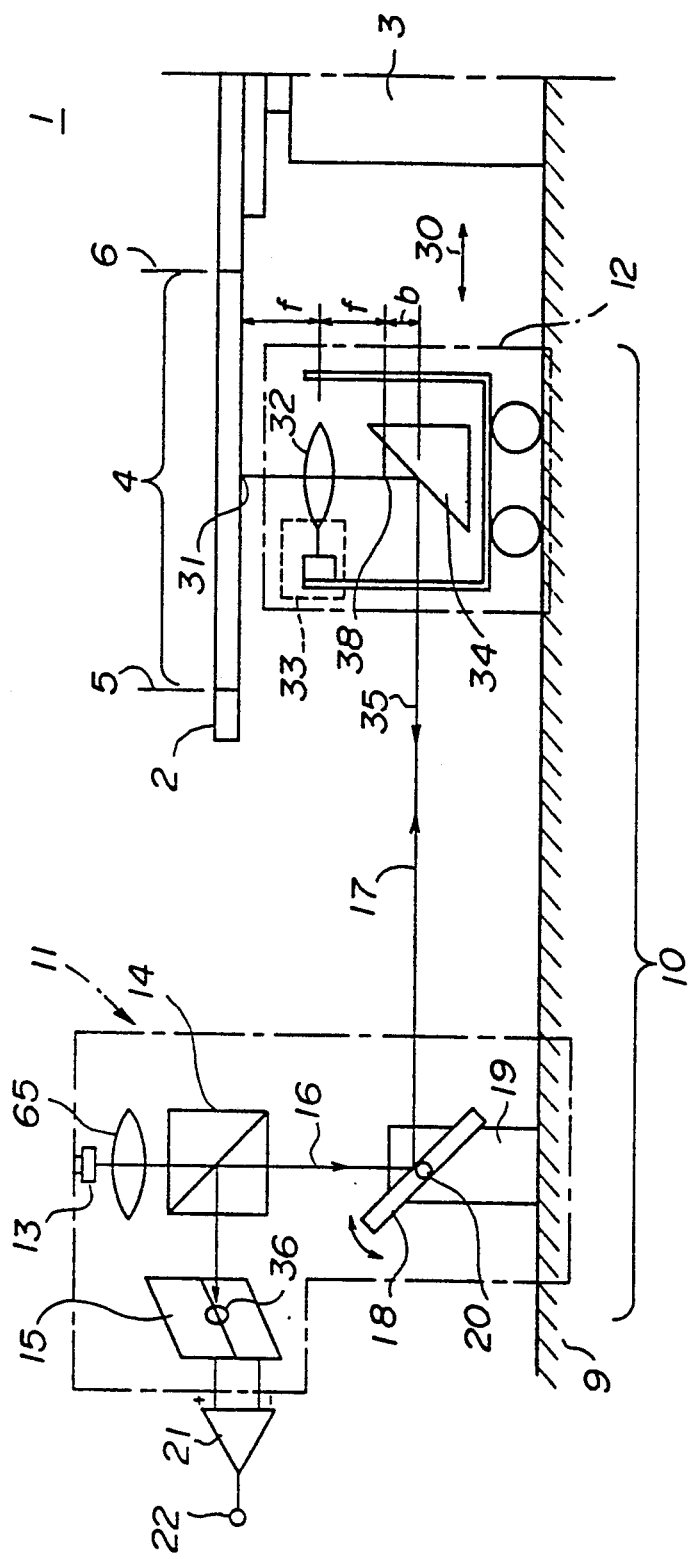
FIG. 1 is a diagram showing the construction of a conventional optical disk drive in a cross sectional view.
Figure 8:
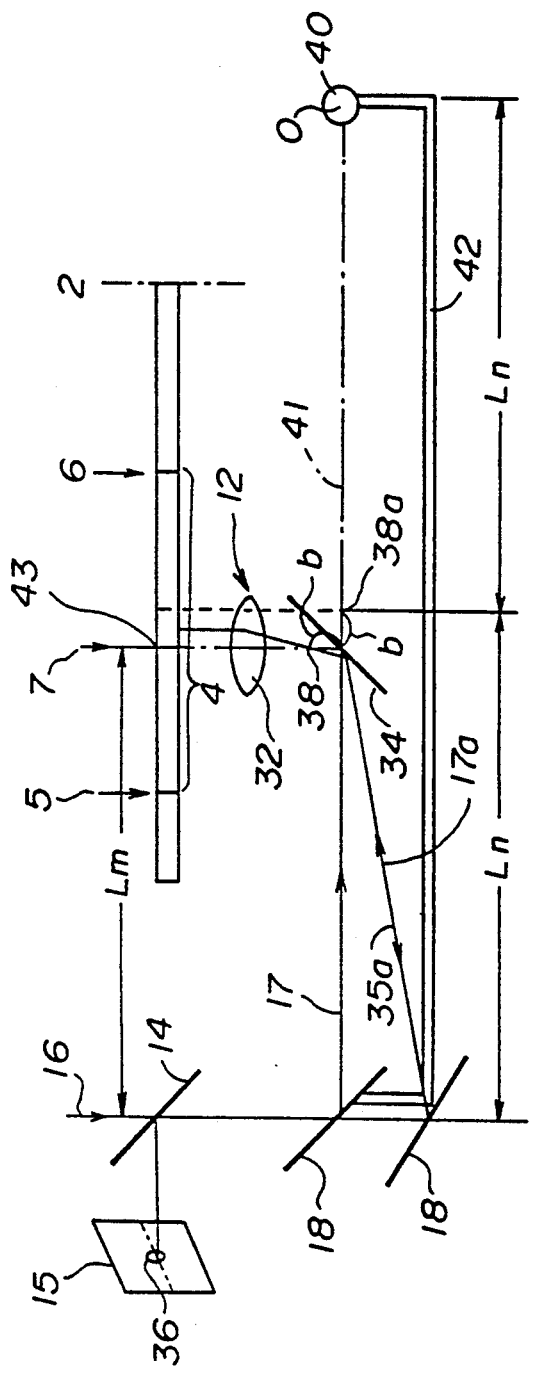
FIG. 8 is a diagram showing the basic construction of the optical disk drive according to a first embodiment of the present invention.

FIG. 8 shows the construction of the optical disk drive according to a first embodiment of the present invention. In FIG. 8, those parts that correspond to the parts already described with reference to FIG. 1 are designated by the same reference numerals and the description thereof will be omitted.

In the present embodiment, the mirror 18 is held on an arm 42 that in turn is held on a body of the optical disk drive in a manner movable in a plane substantially perpendicular to the recording surface of the optical disk 2, wherein the arm 42 is held rotatable about an axis 40 of rotation. Thereby, the mirror 18 is tilted upon the rotational motion of the arm 42 about the axis 40. There, the axis 40 is provided to satisfy a relationship such that the axis 40 is located on a hypothetical line 41 that connects the first mirror 18 and the second mirror 34 and extends further beyond the second mirror 34, and that the axis 40 is located at a position away from the first mirror 18 by a distance that is twice as large as a distance between the first mirror 18 and a reference point 38a that is located also on the hypothetical line 41, wherein the distance from the mirror 18 to the reference point 38a is set identical with the optical path length of the optical beam that travels from the mirror 18 to the back focal point 38 of the lens 32, provided that the lens 32 focuses the optical beam on a point 43 that is included in the data region 4 of the optical disk. In other words, the reference point 38a is determined with respect to the point 43 such that the length b of a line segment drawn vertically to the hypothetical line 41 from the back focal point 38 is equal to the length b of a line segment that is included in the hypothetical line 41 and extending from the merging point of the foregoing vertical line and the hypothetical line 41 to the reference point 38a. The arm 42 includes a driving mechanism not illustrated in FIG. 8, and the driving mechanism moves the arm 42 such that the mirror 18 is tilted upon rotation of the arm 42.

Next, the principle of the embodiment of FIG. 8 will be described with reference to FIGS. 9-12.

Figure 9:
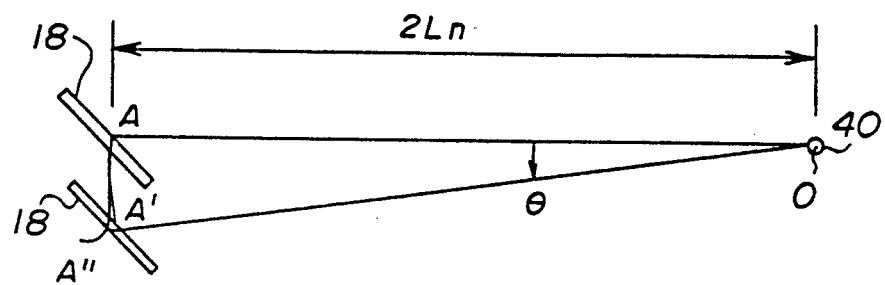
FIG. 9 is a diagram showing a part of the optical disk drive of FIG. 8.

FIG. 9 shows the two different states of the arm 42, wherein the mirror 18 is moved along an arc A—A' upon a rotation of the arm 42 by an angle $\theta$. There, the length of the arm 42 is set to $2L_n$, wherein $L_n$ represents the distance between the mirror 18 and the reference point 38a. In FIG. 9, it should be noted that a line segment A—A" is defined as a tangential to the arc A—A'.

Figure 10:
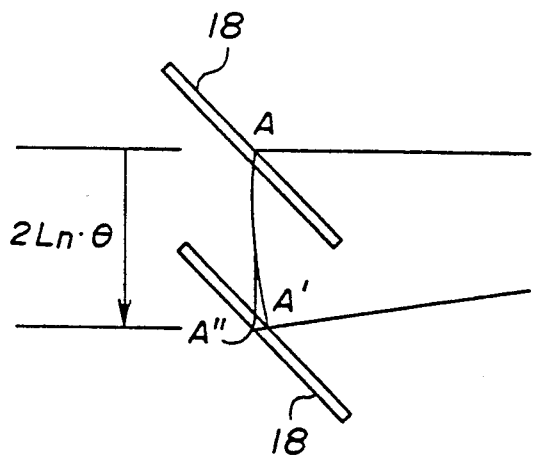
FIG. 10 is a diagram showing a part of FIG. 9 in an enlarged view.
Figure 11:
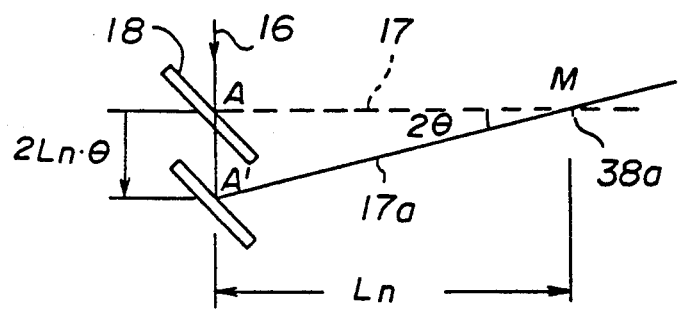
FIG. 11 is a diagram showing the optical path of a laser beam upon tilting of a mirror by a small angle.

Referring to FIGS. 9 and 10, it will be noted that there holds a relationship between the arc A—A' and the line segment A—A" as $$A-A' \approx A-A'' \approx 2 \cdot L_n \cdot \theta,$$

provided that the angle $\theta$ is minute.

When the mirror 18 has tilted by the angle $\theta$, it should be noted that there holds a relationship $$AM = 2 \cdot L_n \cdot \theta / \tan 2\theta \tag{2}$$

wherein AM represents the line segment extending from the point A to the reference point 38a. See the geometry of FIG. 11.

As the angle $\theta$ is minute, one can approximate the term $\tan 2\theta$. Thereby, the term $2\theta$ cancels out in Eq. (2) and Eq. (2) is represented as $$AM = L_n. \tag{3}$$

Eq. (3) indicates that there exists a fixed point in the geometry of FIG. 11 in correspondence to the reference point M (point 38a) through which the optical beam passes irrespective of the tilting angle $\theta$, provided that the axis 40 is determined as shown in FIG. 8.

Figure 12:
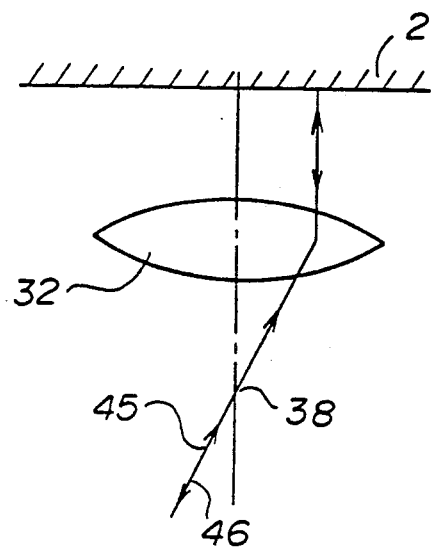
FIG. 12 is a diagrams showing the optical path of a laser beam passing through a lens.

FIG. 12 shows the lens 32 and the optical path of the optical beam that is focused on the recording surface of the optical disk 2 by the lens 32, wherein it will be noted that the path of the beam traveling to the disk 2 and designated by the numeral 45 coincides with the path of the beam 46 that returns from the disk 2.

Thus, it will be understood that, when the lens 32 is located such that the back focal point of the lens 32 coincides with the point 38 corresponding to the reference point 38a as set forth in FIG. 8, there will be no beam offset even when the mirror 18 is tilted by the angle $\theta$. Further, it will be understood that by moving the lens 32 back and forth in the radial direction of the disk 2 about the reference point 38a for scanning the disk surface, one can minimize the beam offset D. Thus, the present invention sets the reference point 38a to correspond generally to the radial center of the data region 4 of the disk 2.

Figure 13:
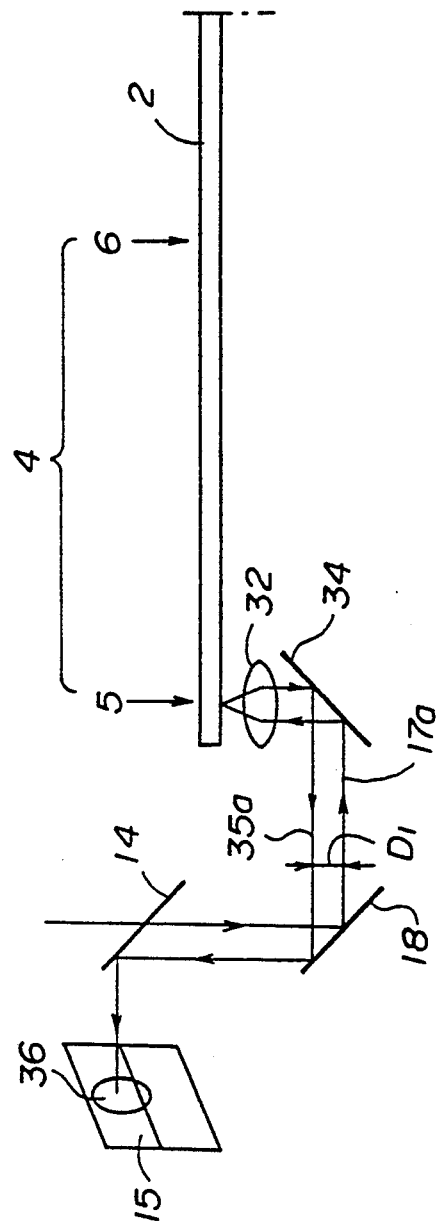
FIG. 13 is a diagram showing the state of the optical disk drive of FIG. 8 in a first state wherein the movable part of the optical head has moved to an outermost periphery of the data region of the optical disk.
Figure 14:
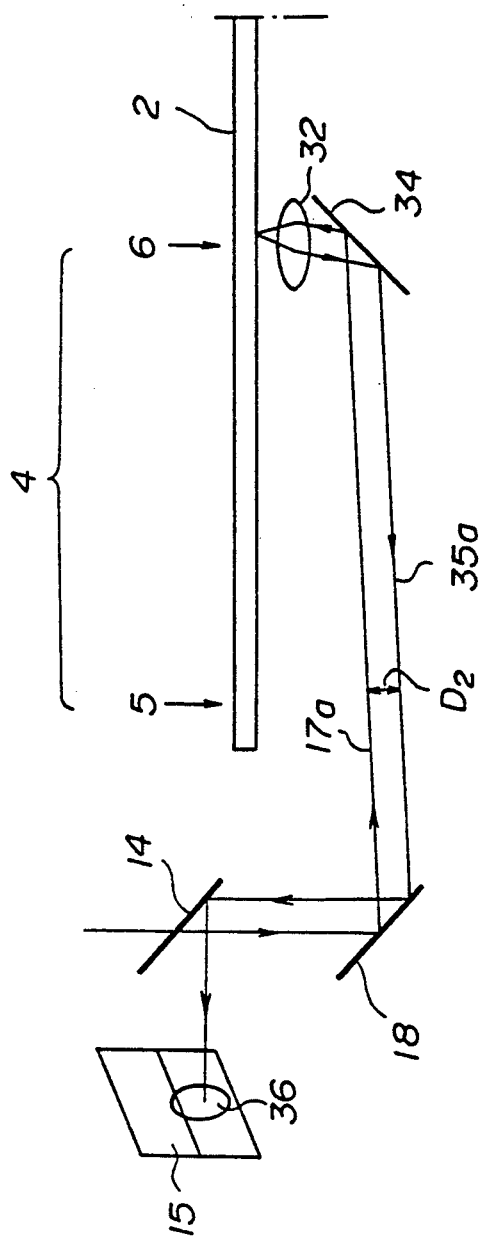
FIG. 14 is a diagram showing the state of the optical disk drive of FIG. 8 in a second state wherein the movable part of the optical head has moved to an innermost periphery of the data region of the optical disk.

FIGS. 13 and 14 show the beam offset occurring in the optical disk drive of FIG. 8 respectively for a case when the lens 32 is located close to the outermost periphery and for a case when the innermost periphery of the data region 4. It will be noted that there still occurs the beam offset as indicated by $D_1$ and $D_2$ because of the lateral offset of the back focal point 38 of the lens 32 from the reference point 38a, wherein the magnitude of the beam offset is minimized in the construction of FIG. 8 as illustrated in FIG. 15.

Figure 2:
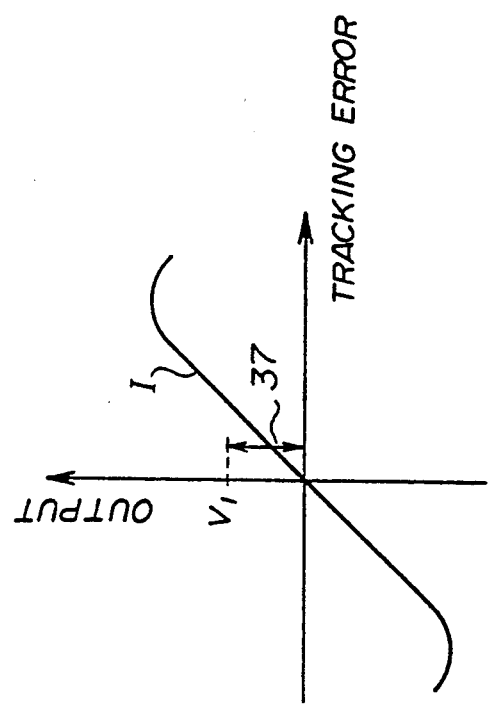
FIG. 2 is a diagram showing the tracking error signal produced in the optical disk drive of FIG. 1.
Figure 3:
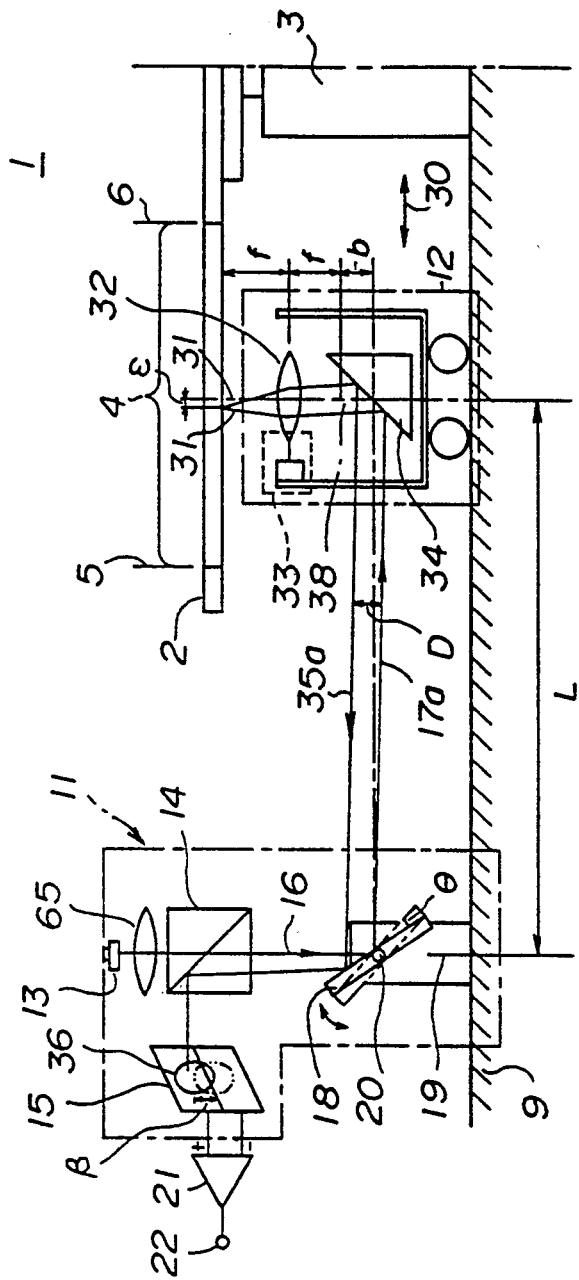
FIG. 3 is a diagram showing the problem of beam offset that occurs in the conventional optical disk drive of FIG. 1.
Figure 4:
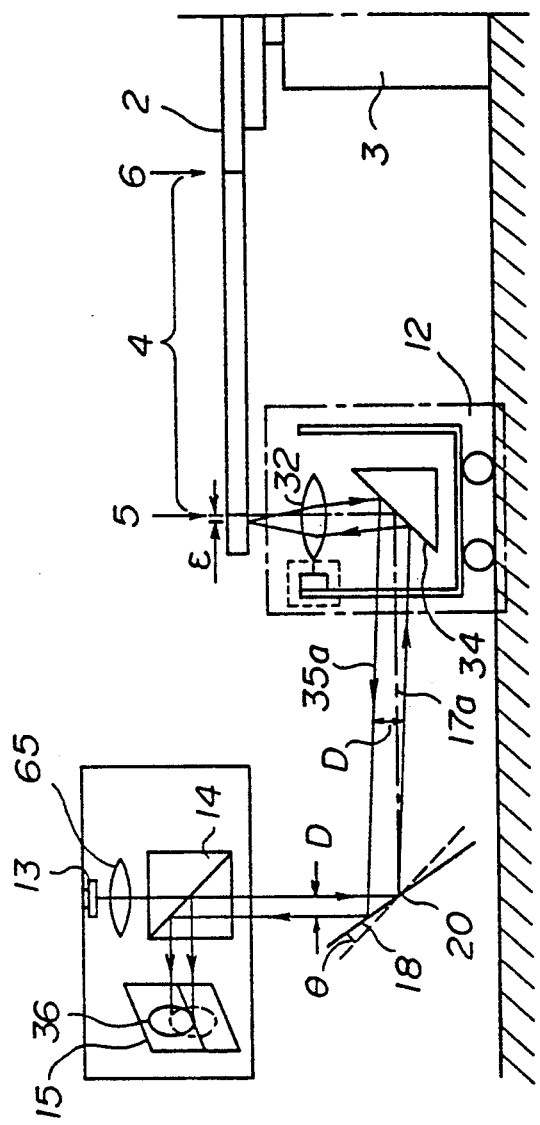
FIG. 4 is another diagram showing the problem of beam offset that occurs in the conventional optical disk drive of FIG. 1.
Figure 5:
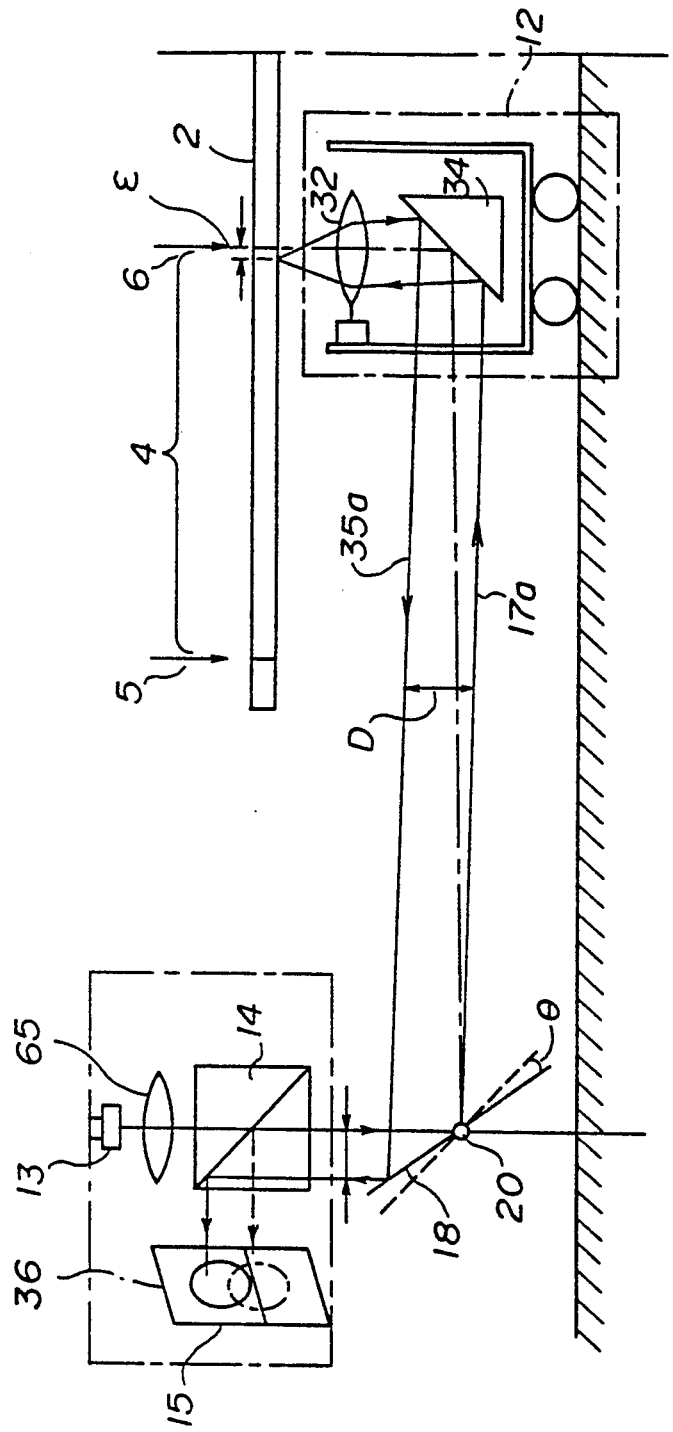
FIG. 5 is a still another diagram showing the problem of beam offset that occurs in the conventional optical disk drive of FIG. 1.
Figure 6:
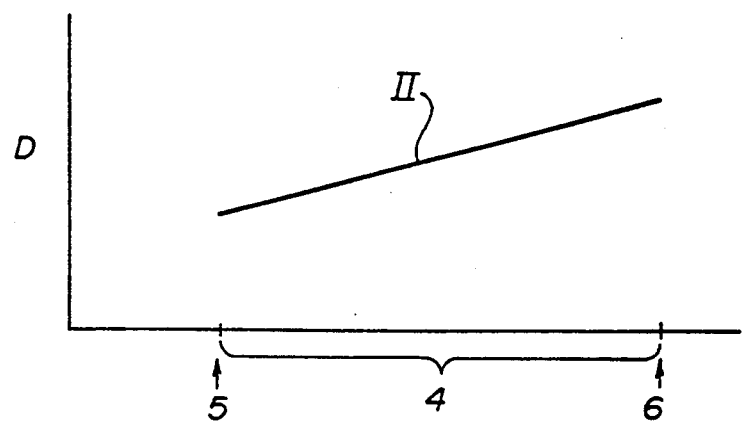
FIG. 6 is a diagram showing the relationship between the beam offset and the position of the movable part of the optical head in the conventional optical disk drive of FIG. 1.
Figure 7:
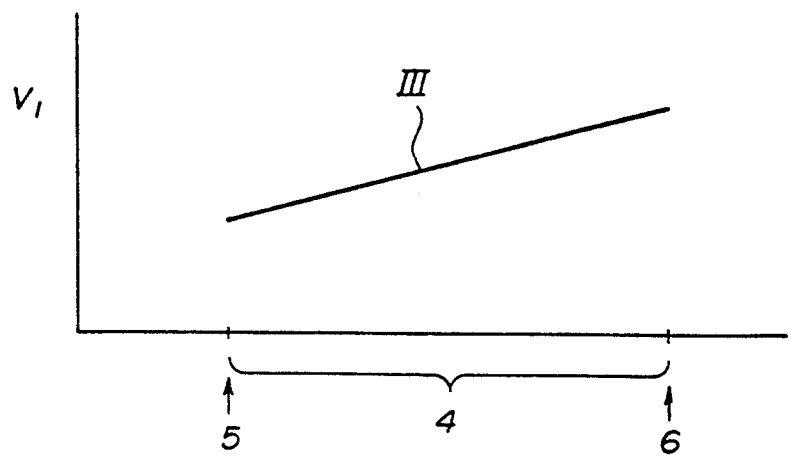
FIG. 7 is a diagram showing the relationship between the apparent tracking error signal that is produced in response to the beam offset and the position of the movable part of the optical head in the conventional optical disk drive of FIG. 1.
Figure 15:
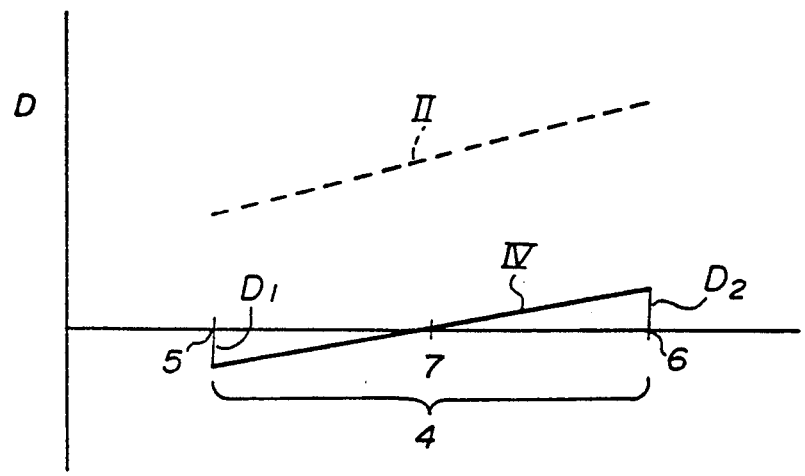
FIG. 15 is a diagram showing the relationship between the beam shift and the position of the movable part of the optical head in the optical disk drive of FIG. 8.
Figure 16:
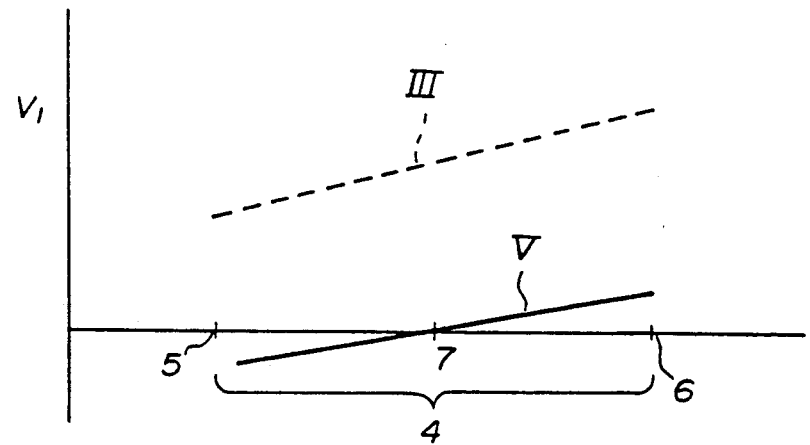
FIG. 16 is a diagram showing the relationship between the apparent tracking error signal and the position of the movable part of the optical head in the optical disk drive of FIG. 8.

FIG. 15 is a diagram similar to FIG. 6 and shows the relationship between the beam offset D and the position of the lens 32 by a line IV, wherein it will be noted that the line IV has now shifted downward with respect to the line II that is shown also in FIG. 6. There, the beam offset D changes from positive to negative in correspondence to the position designated by the numeral 7 that in turn corresponds to the reference point 38a. Further, in correspondence to the relationship of FIG. 15, the magnitude of the apparent tracking error voltage $V_1$ is substantially reduced as compared with the relationship of FIG. 2 as shown in FIG. 16. In FIG. 16, it will be noted that the voltage $V_1$ changes from negative to positive at the position 7 of the lens 32.

Figure 17:
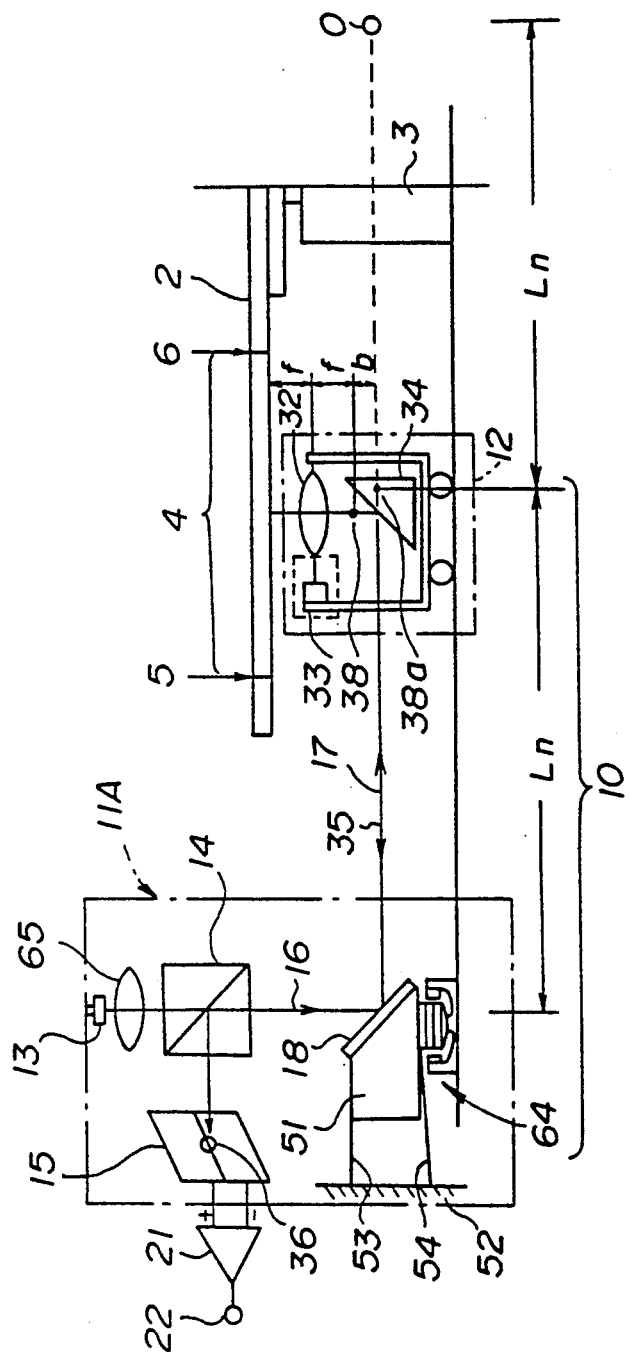
FIG. 17 is a diagram showing the construction of the optical disk drive according to a second embodiment of the present invention.

FIG. 17 shows a second embodiment of the optical disk drive of the present invention. In FIG. 17, those parts described already with reference to preceding drawings are designated by the same reference numerals and the description thereof will be omitted.

Figure 18:
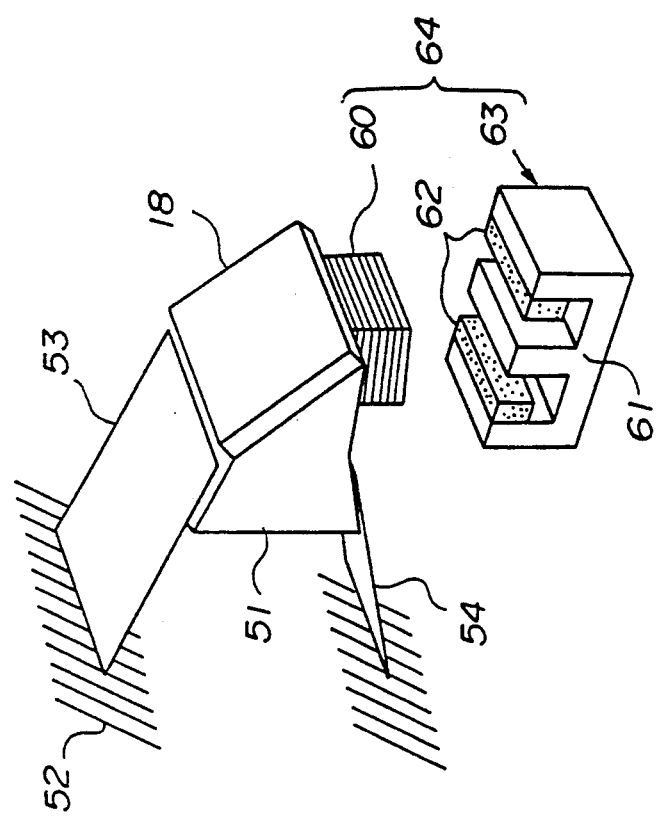
FIG. 18 is a diagram showing the construction of the support mechanism used in the optical disk drive of FIG. 17 for supporting the mirror.

In the present embodiment, the mirror 18 is mounted on a base 51 that in turn is mounted on a body 52 of the optical disk drive by means of a pair of leaf springs 53 and 54. As shown in detail in FIG. 18, the leaf springs 53 and 54 are disposed to support the base 51 respectively at the upper side and at the lower side, and there is provided an electromagnetic actuator 64 at the lower side of the base 51 such that the base is displaced in a plane of the circular path described previously with reference to FIG. 8. It should be noted that the mirror 18 moves along the circular path about the center O that corresponds to the axis 40 of FIG. 8 upon actuation of the electromagnetic actuator 64. Thereby, the movement along the circular path occurs as a result of the deformation of the leaf springs 53 and 54 as will be described later in detail. As shown in FIG. 18, the electromagnetic actuator 64 includes a coil 60 fixed upon the base 51 and a corresponding magnetic circuit device 63, wherein the magnetic circuit device 63 includes a magnetic yoke 61 for accepting the coil 60 and pole pieces 62 that are attached to the magnetic yoke 61.

Figure 19:
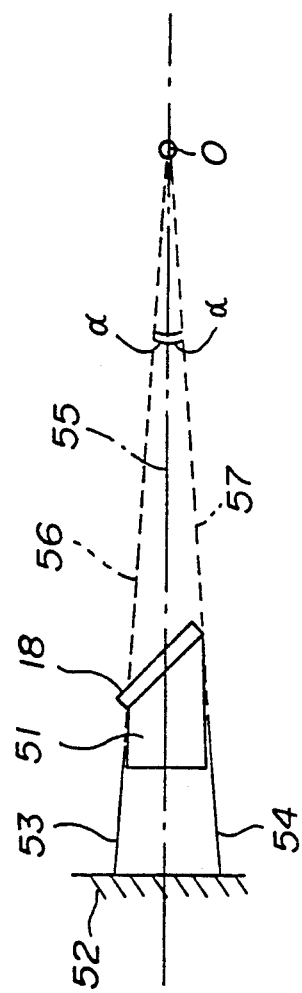
FIG. 19 is a diagram showing the structural feature of the support mechanism of FIG. 18 in a side view.
Figure 20:
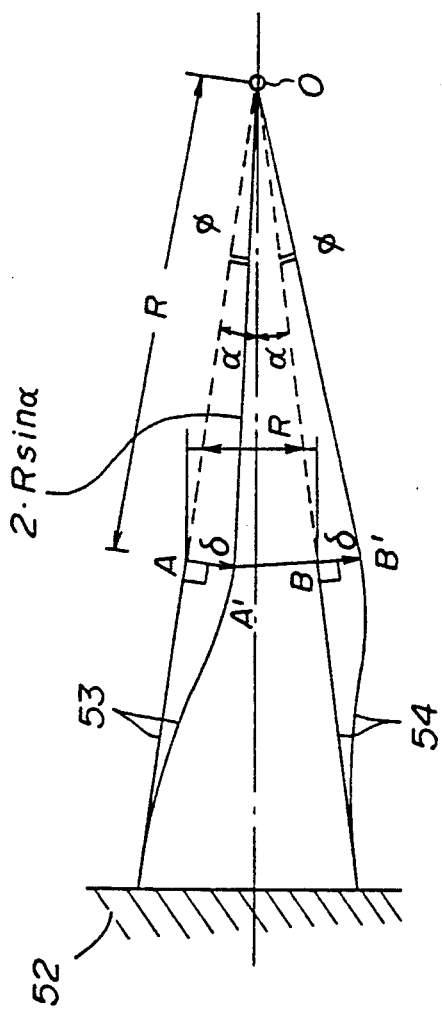
FIG. 20 is a diagram showing the support mechanism of FIG. 18 in a deformed state.

FIG. 19 shows the detailed geometrical setting of the base 51 for supporting the mirror 18, wherein it will be noted that the leaf springs 53 and 54 are disposed on the base body 52 in a manner generally symmetrical about a hypothetical plane 55 of symmetry such that hypothetical extension lines 56 and 57 of the leaf springs 53 and 54 merge with each other at the center O of the circular motion of the mirror 18 with an angle of $2\alpha$. When the base 51 is urged in the downward direction as a result of the action of the electromagnetic actuator 64, the leaf springs 53 and 54 cause a deformation as indicated in FIG. 20, wherein the tip ends A and B of the springs 53 and 54 move respectively to positions A' and B' by a distance $\delta$. In other words, the distance A—A' and the distance B—B' are equal to each other and have the common value $\delta$. There, it should be noted that the distance A-B does not change before and after the leaf spring deformation and there holds a relationship $$A\text{-}B = A'\text{-}B' = 2R\cdot\sin\alpha \tag{4}$$

where R stands for the distance from the point O to the point A or point B.

Hereinafter, a mathematical proof that the points A and B at the end of the leaf springs 53 and 54 move along a circular path about the center O will be provided with reference to FIGS. 21 and 22.

Figure 21:
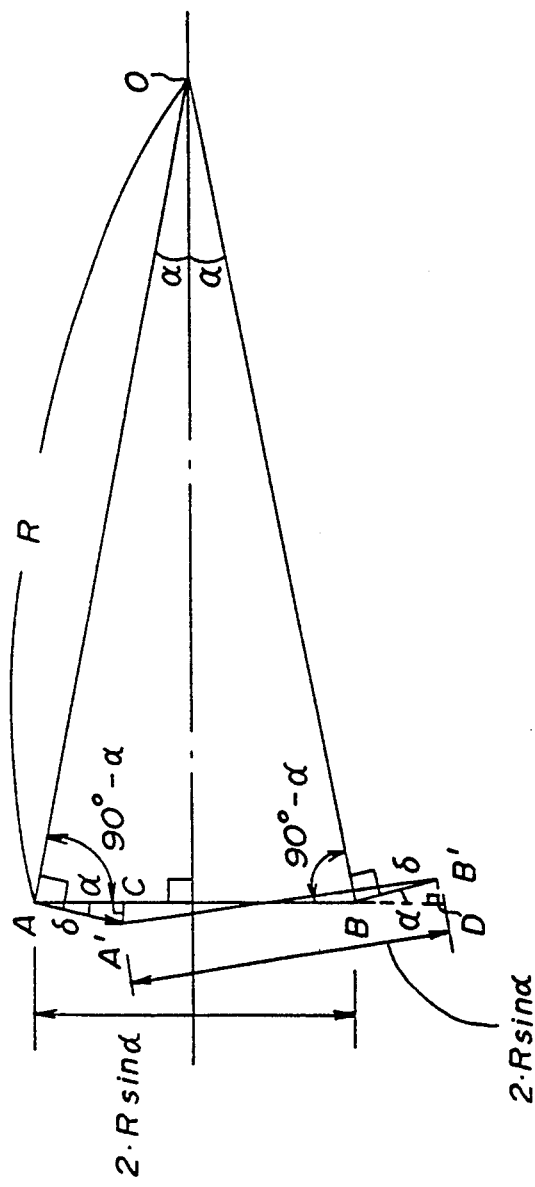
FIG. 21 is a diagram showing the principle of the second embodiment.

FIG. 21 shows the situation of FIG. 20 more schematically, wherein it will be noted that the angle $\angle BAO$ is equal to the angle $\angle ABO$ and there holds a relationship $$\angle BAO = \angle ABO = 90° - \alpha. \tag{5}$$

As a result of Eq. (5), the angle $\angle A'AC$ and the angle $\angle B'BD$ has the same value $\alpha$. Thereby the horizontal component CA' or DB' of the displacement is given as $$CA' = DB' = \delta\cdot\sin\alpha \tag{6}$$

where it should be noted that $AA' = BB' = \delta$.

Thereby, the angle $\theta$ of the line segment A'B' with respect to the line segment AB before the deformation is given as $$\sin\theta = \theta = (\delta\cdot\sin\alpha)/(R\cdot\sin\alpha) = \delta/R. \tag{7}$$

Figure 22:
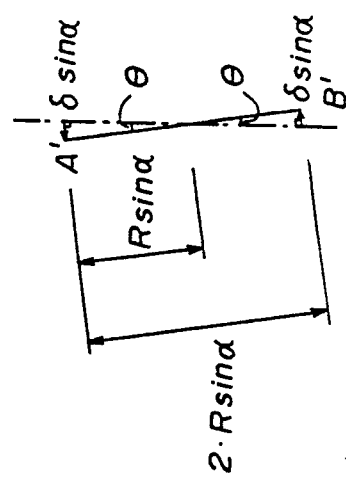
FIG. 22 is a diagram showing a part of FIG. 21 in detail.

See the geometry of FIG. 22. Eq. (7) thereby indicates the relationship $$\delta = R\cdot\sin\theta = R\theta. \tag{8}$$

In view of the geometry of FIG. 20 that indicates the relationship $\delta \approx R\phi$ where $\phi$ represents the angle $\angle AOA'$ ($= \angle BOA'$), one obtains from Eq. (8) the relationship $$\phi \approx \theta \tag{9}$$

that represents a rotational motion of the line segment AB about the axis O.

According to the present invention as set forth in the second embodiment, one can minimize the problem of beam offset by supporting the mirror 18 by a pair of leaf springs to satisfy the geometry of FIG. 19. The axis of rotation O is set twice as large as the distance $L_n$ from the mirror 18 to an arbitrary point located below the data region 4 of the disk 2 in correspondence to the reference point 38a of FIG. 8, wherein it is preferable to set the reference point 38a nearly coincident to the radial center of the data region 4. Strictly speaking, the reference point 38a is of course deviated from the radial center (represented by the point 43) of the data region 4 by the distance b as described previously with reference to FIG. 8.

It should be noted that the electromagnetic actuator of FIG. 18 is applicable also to the embodiment of FIG. 8 for causing the rotational motion of the arm 42.

It should be noted further that the present invention is applicable to the optical disk drives for recording and reproducing information in addition to the optical disk drives used explicitly for reproducing information.

Further, the present invention is not limited to the embodiments described heretofore, but various variations and modifications may be made without departing from the scope of the invention.

What is claimed is:

1. An optical disk drive for reproducing an information signal from a rotary optical disk, comprising:
   revolving means mounted on a body of said optical disk drive for revolving said optical disk about a central axis;
   optical source means for producing an optical beam;
   an optical system for focusing said optical beam on a recording surface of said optical disk, said optical system having a separated construction and comprising a stationary part fixed against said body of said optical disk drive and a movable part that is provided movable with respect to said body;

said stationary part including first mirror means for reflecting said optical beam produced by said optical source means toward said movable part;

said movable part being disposed such that said optical beam from said stationary part is focused upon a data region that is defined on said recording surface of said optical disk as a region extending between an outer periphery and an inner periphery both being defined concentrically about said central axis, said movable part including an objective lens for focusing said optical beam on said recording surface of said optical disk in correspondence to said data region and second mirror means for receiving said optical beam from said stationary means after reflection at said first mirror means and for deflecting the same to said objective lens;

said optical disk drive further including:

support means for supporting said first mirror means in a manner movable about a circular path in a plane substantially perpendicular to said optical disk, with a center of said circular path being located on a hypothetical line that extends from said first mirror means toward said second mirror means and further beyond said second mirror means, said center being located at a position away from said first mirror means by a distance that is twice as large as a distance between said first mirror means and a reference point located on said hypothetical line immediately below a point that is included in said data region of said optical disk; and tilting means for causing a tilt of said first mirror means while said first mirror means is supported by said support means.

2. An optical disk drive as claimed in claim 1, wherein said reference point is set approximately coincident to a center of said data region in the radial direction of said optical disk.

3. An optical disk drive as claimed in claim 1, wherein said reference point is set such that said distance between said first mirror means and said reference point is substantially identical with an optical path length from said optical beam traveling from said first mirror means and a back focal point of said objective lens that focuses said optical beam upon said point that is included in said data region, said back focal point being located at a side opposite to said optical disk with respect to said objective lens.

4. An optical disk drive as claimed in claim 1, wherein said support means comprises an arm having a first end supported rotatably about said center of circular path within the plane of said circular path, and a second opposite end, wherein said second opposite end carries said first mirror means.

5. An optical disk drive as claimed in claim 1, wherein said support means comprises a pair of leaf springs mounted on said body of the optical disk drive for supporting said first mirror means such that said first mirror means moves along said circular path about said center of said circular path.

6. An optical disk drive as claimed in claim 5, wherein said pair of leaf springs are disposed with a mutually inclined relationship such that hypothetical extensions of said pair of leaf springs merge with each other in correspondence to said center of said circular path.

7. An optical disk drive as claimed in claim 6, wherein said tilting means comprises an electromagnetic actuator provided on said body of said optical disk drive such that said first mirror means is urged in a tangential direction of said circular path.

8. An optical disk drive as claimed in claim 1, wherein said optical disk drive further includes tracking error detection means for detecting a tracking error of an optical beam formed on said recording surface of said optical disk, based upon an optical beam that is reflected at said recording surface and returned after reflections at said second and first mirror means.

* * * * *

UNITED STATES PATENT AND TRADEMARK OFFICE
CERTIFICATE OF CORRECTION

PATENT NO. : 5,313,442
DATED : May 17, 1994
INVENTOR(S) : Ohtsuka, et al

It is certified that error appears in the above-indentified patent and that said Letters Patent is hereby corrected as shown below:

On the cover page, after Item [22], the following should appear: --[30]  Foreign Application Priority Data
February 27, 1992 [JP]  Japan ............4-041594--.

Signed and Sealed this

Eighteenth Day of October, 1994

Attest:

BRUCE LEHMAN

Attesting Officer            Commissioner of Patents and Trademarks